(12) United States Patent
Becker et al.

(10) Patent No.: US 6,227,338 B1
(45) Date of Patent: May 8, 2001

(54) SHOCK ABSORBING LEG WITH TOP STEERING ATTACHMENT

(75) Inventors: Otto Becker, Varel; Ede Emken, Esens, both of (DE)

(73) Assignee: Grove U.S. L.L.C., Shady Grove, PA (US)

( * ) Notice: Subject to any disclaimer, the term of this patent is extended or adjusted under 35 U.S.C. 154(b) by 0 days.

(21) Appl. No.: 09/275,191

(22) Filed: Mar. 23, 1999

(30) Foreign Application Priority Data

Mar. 27, 1998 (DE) .............................................. 198 13 796

(51) Int. Cl.⁷ ...................................................... F16F 9/24
(52) U.S. Cl. .................. 188/297; 188/322.19; 267/64.26
(58) Field of Search ..................................... 188/297, 286, 188/287, 288, 322.19, 322.21, 322.16, 281; 267/64.26, 64.15, 64.13; 280/124.145, 124.146, 124.147, 124.148

(56) References Cited

U.S. PATENT DOCUMENTS

| | | | |
|---|---|---|---|
| 4,804,198 | * 2/1989 | Imai et al. | 280/124.145 X |
| 4,826,185 | * 5/1989 | Blanchard et al. | 280/21.1 |
| 5,031,732 | * 7/1991 | Batek et al. | 188/322.12 |
| 5,259,487 | * 11/1993 | Petek | 188/267 |

FOREIGN PATENT DOCUMENTS

| | | | |
|---|---|---|---|
| 209725 | * 6/1960 | (DE) . | |
| 743203 A1 | * 7/1989 | (DE) | 280/124.145 |
| 806709 A1 | * 9/1989 | (DE) . | |
| 2130733 | * 1/1993 | (DE) . | |
| 423349A | * 3/1966 | (FR) . | |
| 869296 | * 8/1957 | (GB) . | |

\* cited by examiner

Primary Examiner—Robert J. Oberleitner
Assistant Examiner—Pamela J. Rodriquez
(74) Attorney, Agent, or Firm—Birch, Stewart, Kolasch & Birch, LLP

(57) ABSTRACT

The invention relates to a shock absorbing assembly including a steering assembly for a vehicle, such as a mobile crane, and consisting of a shock absorbing leg including an outer tube securable to the frame of the vehicle, a wheel carrier telescopically extensible downwards from the outer tube by a piston/cylinder unit, and a steering assembly for the wheel carrier. The steering assembly includes a steering input coupler at the top end of the shock absorbing leg for transmitting steering forces to the wheel carrier through the piston/cylinder unit.

20 Claims, 3 Drawing Sheets

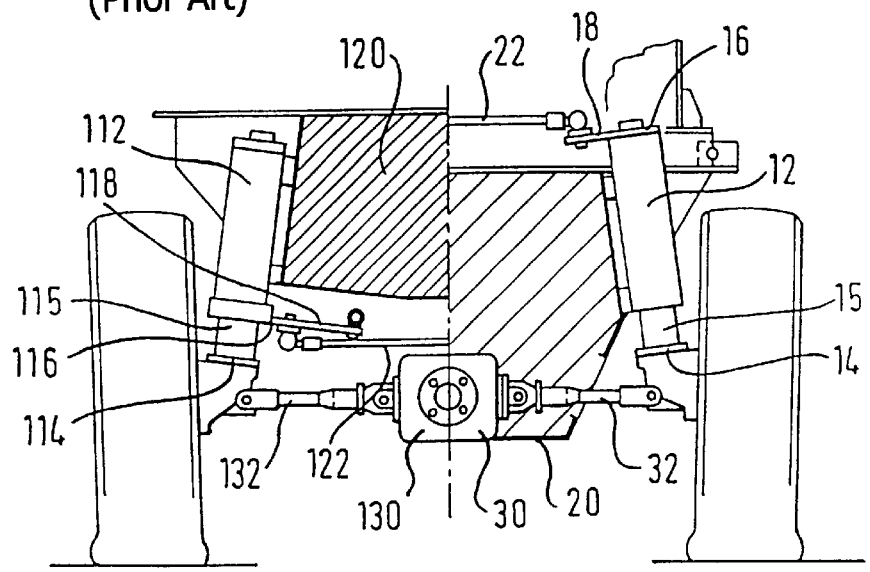
Fig. 3 (Prior Art) (Present Invention)
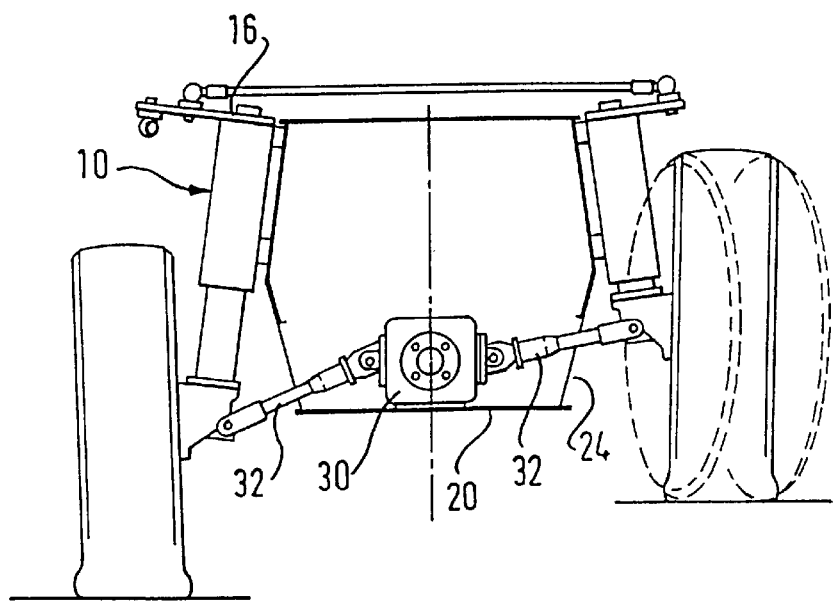
Fig. 4

SHOCK ABSORBING LEG WITH TOP STEERING ATTACHMENT

BACKGROUND OF THE INVENTION

1. Field of the Invention

The present invention relates to a cylindrical telescoping type of shock absorber assembly for vehicles, hereinafter referred to as a shock absorbing leg, and more particularly, to a shock absorbing leg for a mobile crane and including a top steering attachment therefor. In its basic configuration, the shock absorbing leg in accordance with the subject invention comprises an outer tube securable to a vehicle frame, and a wheel carrier telescopically extensible downwards from the outer tube by a piston/cylinder unit and a steering input for the wheel carrier.

2. Description of the Prior Art

Shock absorbing legs currently in wide application, as known for example from German Patent 38 06 709 C2, include wheel carriers which are telescopically extensible downwards via a guide tube. These wheel carriers are secured to a stub axle of a wheel. A steering rod is secured as the steering input to the bottom of the shock absorbing leg, namely to the telescopically extensible wheel carrier. Steering input means are thus located at the bottom of the legs. The steering arm and steering rod for the opposite wheel must therefore also be located below the frame.

Also known from German Patent 37 43 203 C2 is a wheel location assembly likewise configured as a shock absorbing leg. This wheel location assembly includes two steering inputs, namely one in the lower portion of the wheel carrier and another one in the upper portion of the shock absorbing leg.

The drawback in prior art designs, as cited above, is that the bottom steering input along with a steering arm or steering rod secured thereto for the opposite wheel takes up considerable space below the vehicle frame. Such steering arrangements applied to the bottom portion of a shock absorbing leg reduce the space available for the frame design so that optimum design of the frame as regards its cross-sectional size, shape and location and thus, as regards its stiffness, is hampered. The shock absorbing leg as disclosed in the above referenced German Patent 37 43 203 C2 furthermore has the disadvantage that its design is made more complicated and expensive due to two steering inputs being made available, especially as regards maintaining the stability in cases where the steering forces engage two different points on the shock absorbing leg.

SUMMARY OF THE INVENTION

It is the object of the present invention, therefore, to provide a shock absorbing leg which obviates the cited drawbacks of prior art, and more particularly provides a shock absorbing leg permitting an optimum frame configuration.

These and other objects are achieved in accordance with the subject invention by the steering input for the wheel carrier being arranged solely at the top end of a shock absorbing leg, with the steering forces being transmitted to the wheel carrier through the cylinder of a piston/cylinder unit.

Accordingly, the shock absorbing leg in accordance with the invention comprises a single steering input coupler arranged at the top end of the leg. Moreover, a steering arm engaging the leg, or a steering rod for the opposite wheel which is in turn steered by the steering arm, is located above the frame over the wheel so that space is now available for extending the frame design, formerly taken up below the frame by conventional steering arrangements. The frame can thus receive an optimally enlarged cross-section so as to improve its stiffness.

Relocating the steering to the top now permits positioning the steering rods and steering arms, normally located between wheel and frame to a position above the wheels. Unlike the situation in conventional steering systems, the trapezoidal link geometry of the tie rods can now be arranged ahead of the axle, the advantage of this being that for a splayed trapezoidal link geometry the steering arms and ball heads of the steering are no longer moved into close proximity to the frame even on wheel deflection, thus making it possible to install the tie rods through tubes welded in the frame. For space reasons conventional steering arrangements require the axle steering cylinders having a large steering deflection to be arranged under the frame. By relocating the steering to the top, better possibilities now exist for joining the steering cylinders.

Yet a further advantage of the present invention is that, as regards the stability and the telescopic guidance of the wheel carrier the shock absorbing leg can now be adapted optimally to a steering input, it is no longer necessary to take into account or relocate steering forces engaging the wheel carrier from below as well as it is no longer necessary to provide a point of location for a steering rod in the lower region of the wheel carrier. With the shock absorbing leg in accordance with the invention the steering force is thus passed through the leg from an input point at the top end to the wheel carrier below, in other words the wheels are steered "through the legs".

In one embodiment of the shock absorbing leg in accordance with the invention, the cylinder is mounted at its upper closed end on top of the outer tube by means of a radial/axial bearing, more particularly, by means of a ball bearing assembly, with the steering arm of the steering input being mounted on the cylinder preferably by a positive connection. Such a radial/axial bearing is able to accommodate the components of the wheel forces in the axial direction of the leg acting on the cylinder, and translate them via the outer tube to the frame.

In accordance with another preferred aspect the guide tube of the wheel carrier is disposed between the outer tube and the cylinder. This arrangement of the guide tube permits excellent stable location of the wheel carrier by means of the guide tube within the leg by radial forces being optimally handled without obstructing the telescopic movement of the wheel carrier. Preferably the piston rod of the piston running in the cylinder is in contact with the wheel carrier at its bottom end. The outer tube of a shock absorbing leg in accordance with the invention may comprise at its inner side several, preferably two, bearing surface regions for the outer wall of the guide tube of the wheel carrier. These bearing surface regions may be configured as plain or sliding bearings and form specifically the locations in the leg design which handle the forces occurring in the radial direction at the wheels; thus involving the "radial bearing" of the shock absorbing leg.

For transmitting the steering force from the cylinder to the guide tube in one advantageous aspect of the shock absorbing leg in accordance with the invention an axially shiftable, radial positive connection is provided between the inner side of the guide tube and the outer side of the cylinder. This connection more particularly comprises a spline. Furthermore, a bushing is provided at the open cylinder end for the piston rod so as to ensure sealing of the cylinder interior. Supply and discharge of the hydraulic fluid to and from the cylinder interior is affected in one embodiment of the present invention by a port arranged at the closed end of the cylinder, this port extending more particularly also through the steering arm positively connected to the top end of the cylinder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a front elevational view of two different half sections facing each other for providing a direct comparison of a prior art frame/chassis design with that in accordance with the subject invention;

FIG. 4 is a front elevational view illustrative of a frame/chassis design incorporating shock absorbing legs in accordance with the invention and including a differential located within the frame.

DESCRIPTION OF THE PREFERRED EMBODIMENTS

Figure 1:
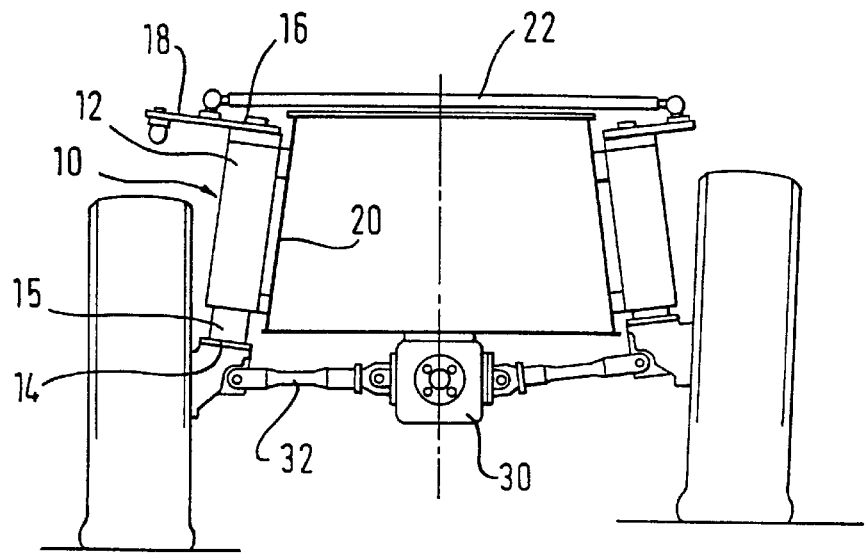
FIG. 1 is a front elevational view illustrative of a shock absorbing leg in accordance with the subject invention in a frame/chassis design.

Referring now to FIG. 1, there is illustrated a frame/chassis design incorporating a shock absorbing leg 10 in accordance with the present invention and, more particularly, illustrating a configuration of a shock absorbing leg for a mobile crane, although it is to be noted that the shock absorbing leg in accordance with the invention is applicable to all types of corresponding frame/chassis designs.

The leg 10 is secured by its outer tube 12 to the frame 20, its transmitting axial forces (forces in the direction of the shock absorbing leg centerline) as well as transverse or radial forces (forces perpendicular to the shock absorbing leg centerline) applied via the corresponding wheel to the frame 20. Telescopically extensible downwards from the outer tube 12 is a wheel carrier 14 which is secured to the outer tube 12 via the guide tube 15. The wheel carrier 14 is secured to the stub axle of the wheel.

The wheel is steered "through the leg" assembly 10 via a mechanical steering input coupler 16 provided on top of the shock absorbing leg 10, the steering input coupler being provided with a steering arm 18. In this arrangement the steering force exerted by the steering arm 18 is transmitted via a piston/cylinder unit of the leg 10, described in more detail later with reference to FIG. 5, to the guide tube 15 and the wheel carrier 14. Also provided on the steering arm 18 is a steering rod 22 which transmits the steering force to the leg of the opposite wheel suspension.

Secured beneath the frame 20 is a differential 30 which provides drive to the wheels of the axle arrangement at the corresponding stub axle via input shafts 32. Due to the "overhead" steering arrangement at the shock absorbing legs 10 in accordance with the invention the frame 20 may be configured larger at its lower extremity portion, i.e. it extends downwards to the extent that the differential 30 can be connected thereto. The stiffness and stability of the frame 20 can thus be increased by this enlargement which is especially of advantage in the case of mobile cranes needed to lift heavy loads.

It is furthermore to be noted that a frame of a conventional size can be relocated further downwards by the design in accordance with the invention so that the overall height (for example of a mobile crane) can be reduced, this being especially of advantage when on the road, particularly in passing through low tunnels. The rotary connections of the crane body, arranged on top of the frame and decisive in influencing the height of the crane, may also be positioned lower, more particularly surrounding the upper portions of the legs so that the center of gravity of the crane can be lowered as a whole.

Figure 2:
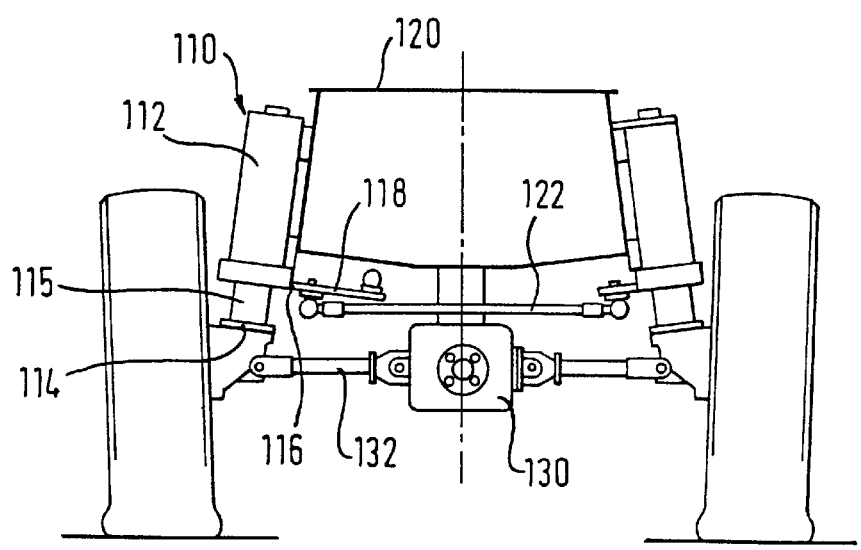
FIG. 2 is a front elevational view illustrative of a prior art frame/chassis design.

To highlight the difference of the design in accordance with the invention as compared to that of prior art, FIG. 2 illustrates a frame/chassis design as is typically employed in prior art, namely with steering input at the bottom of the shock absorbing leg. It is to be noted that the components in FIG. 2 correspond to those having the same end numbers of the components evident from FIG. 1 except that reference numeral 100 merely has been added in each case.

Referring now to FIG. 2, it is now clearly evident that the steering design consisting of the steering arm 118 mounted on the bottom of the outer tube 112 and the steering rod 122 take up more room below the frame 120 and above the differential 130. This is why the frame 120 needs to be designed considerably smaller in cross-section than the frame 20 which, as evident from FIG. 1, can be made available with a shock absorbing leg in accordance with the invention. The steering input at the bottom of the outer tube 112 as shown in FIG. 2 is comparable to the steering input as taught in German patent 37 43 203 C2.

Referring now to FIG. 3, there is illustrated a direct comparison of possible frame cross-sectional sizes in accordance with prior art and the use of a shock absorbing leg in accordance with the invention, a design in accordance with prior art being shown on the left (FIG. 2) while shown on the right is a frame/chassis design incorporating a shock absorbing leg 10 in accordance with the present invention.

The part in accordance with the invention as shown in FIG. 3 (on the right) differs from the embodiment as shown in FIG. 1 in that the differential 30 is located within the frame 20 where it is secured in place. The input shaft 32 of the differential 30 is guided through an opening in the frame to the stub axle. Such frame openings naturally weaken the structure of the frame 20. However, the design as shown in FIG. 3 on the right is possible since only a single opening, namely for penetration by the input shaft 32, is needed. Attempting to integrate the differential 130 likewise in the frame 120 in the prior art design as evident from the left-hand side in FIG. 3 would necessitate having to provide two openings for the steering linkage 118, 120 and the input shaft 132 or to fabricate a single opening sufficiently large so that both assemblies could be guided therethrough. Such a large opening, however, would prohibitively weaken the structure of a conventional frame 120.

In FIG. 3, one-half of the frame cross-section in each case is illustrated crosshatched on both sides. By making use of the shock absorbing leg 10 in accordance with the present invention in which the steering input coupler is located at the top, integrating the differential 30 is now made possible at the bottom and, furthermore, due to the saving in space as a result of the steering input coupler 16 being relocated at the top, a frame cross-section is made available which is substantially larger (as evident on the right) than the cross-section of the frame 120 as shown on the left which has been adapted to a prior art leg design. The stiffness of the design in accordance with the invention as shown on the right in FIG. 3 is accordingly greater; it additionally being evident that the frame can be lowered as a whole, thereby permitting an advantageous low center of gravity location, as well as an overall low-profile design.

Referring now to FIG. 4 there is illustrated a further embodiment of a frame/chassis design incorporating a pair of shock absorbing legs 10 configured in accordance with the invention and a differential 30 integrated with the frame 20. Evident on the left-hand side of FIG. 4 is the wheel carrier in the telescopic extended down position while the leg as shown on the right-hand side is in the retracted condition. Also evident on the right in FIG. 4 is the opening for passage of the input shaft 32 provided in the frame 20 and identified by the reference numeral 24. The input shafts 32 move back and forth between the extreme positions as shown on the left and right in FIG. 4 in the various driving conditions. Because the steering input coupler 16 is situated on top of the leg 10, the steering now takes up no space in the lower portion of the vehicle frame which can be accordingly made larger in width. The increase in stiffness gained thereby permits producing the openings 24 for the input shafts 32.

Figure 5:
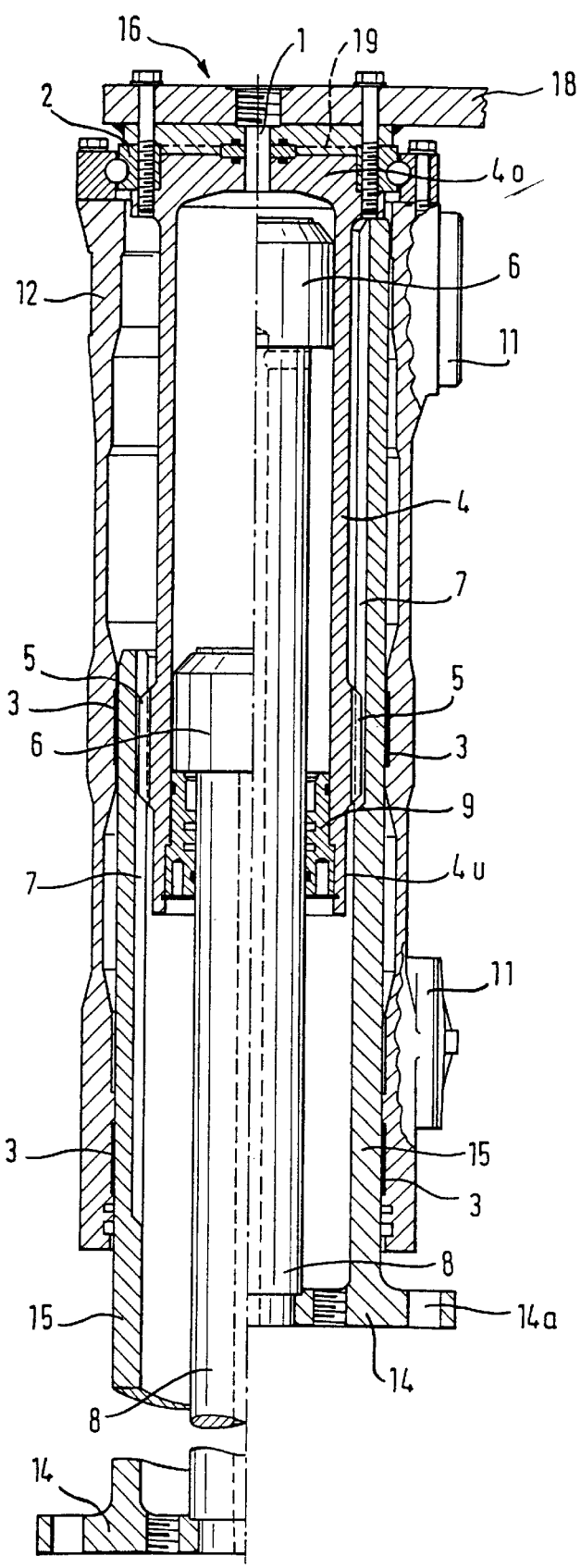
FIG. 5 is a split longitudinal cross-sectional view through a shock absorbing leg in accordance with the subject invention, the left-hand side being illustrative of an extended condition of the shock absorbing leg and the right-hand side being illustrative of a retracted condition thereof.

Referring now to FIG. 5, there is illustrated in longitudinal cross-section, the details of a shock absorbing leg in accordance with the invention, the left-hand side showing the extended condition and the right-hand side showing the leg retracted. The main components of the leg as shown are the outer tube 12, the wheel carrier 14 with its guide tube 15, the cylinder 4, the piston 6 with the piston rod 8, as well as the steering input coupler 16 secured to the top of the cylinder including the steering arm 18. The outer tube 12 is fixedly secured with the aid of fasteners 11 to the vehicle frame (not shown). The cylinder 4 is rigidly mounted by its top closed end 40 but axially rotatable via a roller bearing assembly 2 and more particularly a ball bearing assembly in and on the top of the outer tube 12. The top closed end 40 of the cylinder 4 is connected by its top face end via a positive connection 19 as well as via bolts (not shown) to the steering arm 18 mounted non-rotatably via an adapter. The steering arm 18 in combination with the non-rotatable fastener at the top closed end 40 of the cylinder forms the steering input coupler 16.

An opening 1 passing through the top closed end 40 of the cylinder and the steering arm 18 supplies the cylinder interior with hydraulic fluid. In the cylinder 4, the piston 6 runs between the two extreme positions shown on the left and right. The bottom open end 44 of the cylinder 4 is provided with a bushing 9 in which the piston rod 8 of the cylinder slides. This bushing 9 also includes the necessary sealing elements.

At its bottom end the piston rod 8 is fixed to the middle portion of the wheel carrier 14, for example via a bolted connection (not shown). The wheel carrier 14 is the component which together with the piston rod 8 is extended and which is secured by a connecting flange 14a to a stub axle of the corresponding wheel. The wheel carrier 14 is integrally configured with its guide tube 15 which is axially shiftable and supported between the outer wall of the cylinder 4 and the inner wall of the outer tube 12. The guide tube 15, moreover, is supported by the planar surface bearings 3 provided in the outer tube 12. It is the bearings 3 that handle the majority of the transverse or radial forces.

The steering force (steering moment) acting on the cylinder 4 via the steering arm 18 of the steering input coupler 16 is transmitted via a spline as torque to the guide tube 15 and thus to the wheel carrier 14. The spline consists of a short splined section 5 in the lower portion of the outer wall of the cylinder 4 as well as a longer spline section 7 on the inside in the upper and middle portion of the guide tube 15. It is to be noted that basically any radially positive, axially shiftable means of force transmission may be selected, thus, for instance, sliding springs, splined or polygonal sections. The splined section 5 employed in the example embodiment as shown in FIG. 5 at the outer wall of the cylinder 4 is preferably arranged in the region of the top plain bearing 3 so that no wheel forces come to bear with wear of the radial bearing.

By the design as described heretofore, a shock absorbing leg in accordance with the present invention can be advantageously adapted as a top mounted steering input assembly. The steering forces are transmitted from the arm 18 of the steering input coupler 16 via the cylinder 4, the spline 5, 7 and the guide tube 15 "through the leg" to the wheel carrier 14. Relocating the steering input to the top in this way saves space in the lower chassis region thus making it possible to design a relatively larger frame cross-section.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock absorbing leg for a vehicle, comprising:
   an outer tube securable to a vehicle frame;
   a piston/cylinder unit, including a cylinder and telescoping piston with a piston rod;
   a guide tube for connection to a wheel carrier, said guide tube being located between said outer tube and said cylinder, said piston rod for engaging the wheel carrier to telescopically extend the wheel carrier downwards from said outer tube; and
   a connection located adjacent a top end of said outer tube and connected to said piston/cylinder unit, said connection for connecting to a steering input coupler, wherein steering forces are transmittable from said connection to said guide tube through said piston/cylinder unit.

2. A shock absorbing leg as set forth in claim 1 and additionally including a pivot bearing assembly between said outer tube and said piston/cylinder unit.

3. A shock absorbing leg as set forth in claim 2 wherein said pivot bearing assembly comprises an axial roller bearing assembly located at said top end of said outer tube.

4. A shock absorbing leg as set forth in claim 3 wherein said roller bearing assembly comprises a ball bearing assembly.

5. A shock absorbing leg as set forth in claim 1, wherein said outer tube includes an inner wall having a plurality of peripheral bearing surfaces for contacting adjacent outer wall portions of said guide tube.

6. A shock absorbing leg as set forth in claim 5 wherein said plurality of peripheral bearing surfaces comprise at least two axially spaced apart bearing surfaces.

7. A shock absorbing leg as set forth in claim 1 and additionally including an axially shiftable, radially positive connection between an inner wall of said guide tube and an outer wall of said cylinder.

8. A shock absorbing leg as set forth in claim 7 wherein said connection comprises a spline connection between said guide tube and said cylinder.

9. A shock absorbing leg as set forth in claim 1 and additionally including a sliding seal between said cylinder and said piston.

10. A shock absorbing leg as set forth in claim 9 wherein said sliding seal includes a bushing secured to a lower open end of said cylinder.

11. A shock absorbing leg as set forth in claim 1, further comprising:
   a hydraulic fluid input port located in an upper end of said cylinder.

12. A steering/suspension assembly for a vehicle, comprising:
   an outer tube securable to a vehicle frame;
   a piston/cylinder unit, including a cylinder and telescoping piston with a piston rod;
   a wheel carrier;
   a guide tube connected to said wheel carrier, said guide tube being located between said outer tube and said cylinder, said piston rod engaging said wheel carrier to telescopically extend said wheel carrier downwards from said outer tube;
   a steering input coupler; and
   a connection located adjacent a top end of said outer tube and connected to said piston/cylinder unit, said connection connected to said steering input coupler, wherein steering forces are transmittable from said steering input coupler to said wheel carrier through said piston/cylinder unit.

13. A steering/suspension assembly as set forth in claim 12, further comprising:
   a steering arm connected to said steering input coupler.

14. A steering/suspension assembly as set forth in claim 12, further comprising:
   a first hydraulic fluid input port located in an upper end of said cylinder for supplying hydraulic fluid to an interior portion of said cylinder.

15. A steering/suspension assembly as set forth in claim 14, further comprising:
   a steering arm connected to said steering input coupler; and
   a second hydraulic fluid input port formed in said steering arm and aligned with said first hydraulic fluid input port.

16. A steering/suspension assembly as set forth in claim 12, further comprising:
   a pivot bearing assembly between said outer tube and said piston/cylinder unit.

17. A steering/suspension assembly as set forth in claim 12, wherein said outer tube includes an inner wall having a plurality of peripheral bearing surfaces for contacting adjacent outer wall portions of said guide tube.

18. A steering/suspension assembly as set forth in claim 12, further comprising:
   an axially shiftable, radially positive connection between an inner wall of said guide tube and an outer wall of said cylinder.

19. A steering/suspension assembly as set forth in claim 18, wherein said axially shiftable, radially positive connection includes a spline connection between said guide tube and said cylinder.

20. A shock absorbing leg for a vehicle, comprising:
   an outer tube securable to a vehicle frame;
   a piston/cylinder unit, including a cylinder and telescoping piston with a piston rod, said piston rod for engaging a wheel carrier to telescopically extend the wheel carrier downwards from said outer tube;
   a connection located adjacent a top end of said outer tube and connected to said piston/cylinder unit, said connection for connecting to a steering input coupler, wherein steering forces are transmittable from said connection through said piston/cylinder unit; and
   a sliding seal between said cylinder and said piston, wherein said sliding seal includes a bushing secured to a lower open end of said cylinder.

* * * * *